US012036165B2

(12) United States Patent
Daniels et al.

(10) Patent No.: US 12,036,165 B2
(45) Date of Patent: *Jul. 16, 2024

(54) ANTI-SLIDE BODY SUPPORT

(71) Applicants: Brian P. Daniels, Meriden, CT (US); Nicholas B. Daniels, Meriden, CT (US)

(72) Inventors: Brian P. Daniels, Meriden, CT (US); Nicholas B. Daniels, Meriden, CT (US)

( * ) Notice: Subject to any disclaimer, the term of this patent is extended or adjusted under 35 U.S.C. 154(b) by 16 days.

This patent is subject to a terminal disclaimer.

(21) Appl. No.: 17/846,427

(22) Filed: Jun. 22, 2022

(65) Prior Publication Data

US 2022/0313519 A1 Oct. 6, 2022

Related U.S. Application Data

(63) Continuation of application No. 17/028,753, filed on Sep. 22, 2020, now Pat. No. 11,400,000.

(60) Provisional application No. 62/907,092, filed on Sep. 27, 2019.

(51) Int. Cl.
*A61G 7/075* (2006.01)
*A61G 7/05* (2006.01)

(52) U.S. Cl.
CPC ......... *A61G 7/0755* (2013.01); *A61G 7/0508* (2016.11)

(58) Field of Classification Search
None
See application file for complete search history.

(56) References Cited

U.S. PATENT DOCUMENTS

| | | | | |
|---|---|---|---|---|
| 1,349,801 A * | 8/1920 | Alsten | ........................ | B66F 3/12 254/126 |
| 1,709,746 A | 4/1929 | Schwerin | | |
| 3,343,184 A | 9/1967 | Friedman et al. | | |

(Continued)

FOREIGN PATENT DOCUMENTS

| | | | |
|---|---|---|---|
| FR | 775295 | A | 12/1934 |
| GB | 233013 | A | 5/1925 |
| GB | 575206 | A | 2/1946 |

OTHER PUBLICATIONS

Daynard, D., et al., "Biomechanical analysis of peak and cumulative spinal loads during simulated patient-handling activities: a substudy of a randomized controlled trial to prevent lift and transfer injury of health care workers", Applied Ergonomics 32 (2001), pp. 199-214.

(Continued)

*Primary Examiner* — Adam C Ortiz
(74) *Attorney, Agent, or Firm* — J-TEK LAW PLLC; Jeffrey D. Tekanic; Scott T. Wakeman

(57) ABSTRACT

A body support for use with a bed having a top end, a bottom end and a mattress, including a back vertical wall removably mountable at the bottom end of the bed in a fixed position in which the wall extends across the bed and above the mattress, a front vertical wall extending parallel to the back wall above the mattress, and a scissor jack disposed between, secured to and connecting the front wall and the back wall so as to be capable of expanding and contracting horizontally to move the front wall away from and toward the back wall above the mattress in maintained parallel relation to the back wall, whereby the front wall serves as a foot support for an individual lying on the bed and is positionally adjustable in accordance with the individual's height. A pad may be removably mounted on the front wall.

22 Claims, 8 Drawing Sheets

(56) References Cited

U.S. PATENT DOCUMENTS

| | | | | | |
|---|---|---|---|---|---|
| 3,505,724 | A | | 4/1970 | Leitner et al. | |
| 3,638,250 | A | * | 2/1972 | Johnson | A47C 20/022 5/651 |
| 3,866,251 | A | * | 2/1975 | Pounds | A47C 20/022 5/624 |
| 4,055,329 | A | * | 10/1977 | Hammond | B66F 3/12 254/424 |
| 4,802,653 | A | | 2/1989 | Engel | |
| 5,131,628 | A | * | 7/1992 | Huang | B66F 3/12 254/7 R |
| 5,158,266 | A | * | 10/1992 | Alten | B66F 13/00 254/DIG. 4 |
| 5,611,097 | A | * | 3/1997 | Dumke | A47C 20/022 5/651 |
| 6,375,161 | B2 | * | 4/2002 | Garceau | B66F 3/12 254/122 |
| 9,605,439 | B2 | * | 3/2017 | Young | E04G 21/1841 |
| 11,400,000 | B2 | * | 8/2022 | Daniels | A61G 7/0525 |
| 2001/0047545 | A1 | | 12/2001 | Watanabe et al. | |
| 2005/0151409 | A1 | * | 7/2005 | Infanti | A47C 4/028 297/440.22 |
| 2007/0011811 | A1 | | 1/2007 | Johannsen | |
| 2015/0143629 | A1 | | 5/2015 | Receveur | |
| 2015/0290061 | A1 | | 10/2015 | Stafford et al. | |

OTHER PUBLICATIONS

Occupational Injuries/Illnesses and Fatal Injuries Profiles 2011-2019 with regard to "Overexertion in lifting, lowering (code 711XXX)", U.S. Bureau of Labor Statistics, downloaded Oct. 25, 2021.

Occupational Injuries/Illnesses and Fatal Injuries Profiles 2011-2019 with regard to "Overexertion in pushing, pulling, or turning (code 712XXX)", U.S. Bureau of Labor Statistics, downloaded Oct. 25, 2021.

Pay, N. A., et al., "Assessment of alternative methods for informal information caregivers to perform patient repositioning tasks" Applied Ergonomics 93 (2021) 103259, pp. 1-12.

Pieretti, L. F., et al., Medical Cost of Workers' Compensation Claims Related to Patient Handling and Mobility Tasks Within Skilled Nursing Facilities, Continuing Care Retirement Communities and Assisted Living Facilities, JOEM 62 (12), (2020) e738-e747.

Wiggermann, N., et al., "Effect of Repositioning Aids and Patient Weight on Biomechanical Stresses When Repositioning Patients in Bed", Human Factors 63(4), SCL Health, Broomfield, CO, USA. (2021), pp. 565-577.

Zhou, J., et al. "The effects of hospital bed features on physical stresses on caregivers when repositioning patients in bed", Applied Ergonomics 90 (2021) 103360, pp. 1-7.

International Search Report and Written Opinion dated Jan. 7, 2021 in connection with International Application No. PCT/US2020/052086.

PCT/US2020/052086, dated Jan. 7, 2021, International Search Report and Written Opinion.

Communication from the European Patent Office dated Jul. 27, 2023, in counterpart EP application serial No. 20 868 859.8, including Supplementary European Search Report, Search Opinion and examined claims 1-15.

American Nurses Association, "Safe Patient Handling and Mobility Interprofessional/Interprofessional National Standards Across the Care Continuum" (2nd edition 2021).

American Nurses Association, "Safe Patient Handling and Mobility Interprofessional/Interprofessional National Standards Across the Care Continuum" (1st edition 2013).

Matz, M.W., Patient Handling and Mobility Assessment: A White Paper, The Facility Guidelines Institute (2nd edition, 2019).

United States Bureau of Labor Statistics, Occupational Injuries/Illnesses and Fatal Injuries Profiles (2022), downloaded from www.bls.gov.

Zhou, J, "Physical Stresses on Caregivers when Pulling Patients Up in Bed: Effect of Repositioning Aids and Patient Weight", SAGE Journals (2019), 63(1), pp. 1057-1061.

* cited by examiner

ANTI-SLIDE BODY SUPPORT

CROSS REFERENCE TO RELATED APPLICATIONS

This application is a continuation of U.S. Ser. No. 17/028,753, filed Sep. 22, 2020, now U.S. Pat. No. 11,400,000, which claims the benefit, under 35 U.S.C. § 119(e), of U.S. provisional patent application No. 62/907,092, filed Sep. 27, 2019, the entire disclosure of which is incorporated herein by this reference.

BACKGROUND OF THE INVENTION

This invention relates to an anti-slide body support device for a bed or the like.

Hospital, nursing home and other health care beds and the like, as well as standard residential bed frames, typically are so designed that only individuals about six feet tall or more will have the plantar regions of their feet in contact with, or in close proximity to, the footboard. Such location of the plantar region is necessary to prevent patients', or other bed occupants', bodies from sliding down toward the footboard when the bed is inclined or when the patients, or other bed occupants, are in a fully supine position for extended periods of time. This location of the plantar region also is beneficial to a individual's ability to enter the bed and position himself/herself correctly either when the bed is inclined or when the individual intends to achieve a fully supine position.

Although some beds may have the ability to extend the footboard away from the end of the mattress thereby accommodating taller individuals, no readily available device currently exists for adapting ordinary hospital or other beds so that the footboard can be effectively contracted toward the top end of the bed to accommodate individuals shorter than about six feet tall in order to provide proper anti-slide body support. Shorter individuals therefore regularly slide down inclined beds into medically undesirable or unsafe positions and often struggle to position themselves properly upon entering the bed, risking injury or other medical complications. Confused or disoriented individuals with an excess of bed space also engage in motions resulting in undesirable changes of body position, including positions in which the legs or feet extend off the bed either on the sides or over the footboard. These circumstances require that medical staff or other attendants in a health care facility, a rehabilitation facility or residential housing repeatedly boost or lift these individuals into the proper position, often causing injury to themselves and risking injury or other medical complications to the individual. Consequent patient and non-patient, or other bed occupant and non-bed occupant, injuries result in, among other things, additional medical expenses, employee sick leave and lost staffing productivity. Further medical issues, such as pressure ulcers, may arise when the footboard is a hard material, such as plastic or metal, due to lengthy periods of interface pressure on the individual's legs, knees, ankles, and/or feet.

SUMMARY OF THE INVENTION

Objects of the present invention are to provide a simple, lightweight, easily portable, readily sanitizable, manually or electronically powered anti-slide body support which can be attached to a bed structure such as a footboard as necessary, which effectively can contract the footboard toward the top end of the bed to the exact position warranted by the height of each individual, which can be easily adjusted in continuous, rather than discrete, increments as necessary during the entire period of treatment, and which eliminates the hazards of a hard footboard.

To these and other ends, the present invention broadly contemplates the provision of a body support for use with a bed having a top (head) end, a bottom (foot) end and a mattress extending between them, the body support comprising: a stationary back vertical wall disposed at the bottom end of the bed in a fixed position in which the wall extends across the bed and above the mattress; a movable front vertical wall extending parallel to the back wall across the bed and above the mattress, between the top and bottom ends of the bed; and a scissor jack disposed between, secured to and connecting the front wall and the back wall, such that the scissor jack is capable of expanding and contracting horizontally to move the front wall away from and toward the back wall above the mattress in maintained parallel relation to the back wall.

The scissor jack includes two pairs of arms, each pair of arms having a central joint at which the arms of the pair are pivotally connected to each other, and a horizontal screw extending transversely of the bed above the mattress through the joints of both pairs of arms and threadedly engaging one or both of the joints such that turning of the screw in one rotational direction causes the pairs of arms to expand, moving the front wall away from the back wall, and turning of the screw in an opposite rotational direction causes the pairs of arms to contract, moving the front wall toward the back wall, wherein the screw is provided with or connected to a manually or electronically rotatable member (e.g., a knob) for turning the screw in either direction, and wherein, when the screw is not being turned, the jack maintains the front wall stationary relative to the back wall against pressure of a foot or feet pushing on the front wall in a direction toward the bottom end of the bed.

In particularly advantageous embodiments of the invention, the back wall is removably mountable at the bottom end of the bed in the aforesaid fixed position. For use with a bed having a fixed transverse footboard projecting above the mattress, the back wall includes a hook member for hooking over the footboard to mount the back wall thereto with the back wall disposed on a side of the footboard facing the top end of the bed. The back wall, the front wall and the scissor jack are secured together as a portable unit mountable on and removable from a bed.

As a further feature of the invention, in particular embodiments thereof, at least one of the back wall and the front wall has side members laterally enclosing a space within which the scissor jack is disposed. Both the back wall and the front wall may have such side members, cooperatively protecting the scissor jack when the front wall is in a position of closest approach to the back wall.

The body support may additionally include a pad mounted on the surface of the front wall facing toward the top end of the bed. The pad may be removably mounted on the front wall and may have a vertically sloping surface facing the top end of the bed. Conveniently, the pad includes a flexible base extending laterally outward beyond the sides of the pad, and the surface of the front wall facing the top end of the bed bears projections, including notched retainers for receiving edge portions of the flexible base, to hold the pad on the front wall.

Further features and advantages of the invention will be apparent from the detailed description hereinbelow set forth, together with the accompanying drawings.

DETAILED DESCRIPTION

Figure 1:
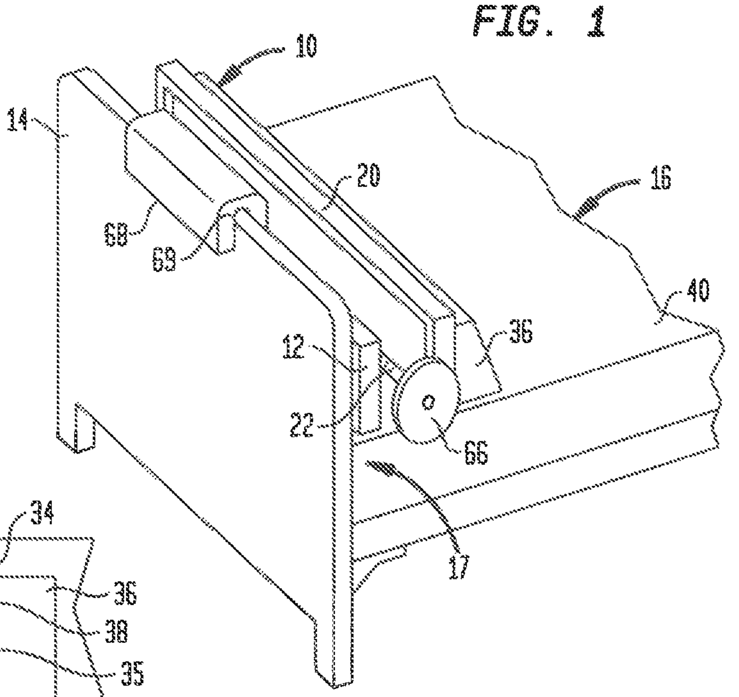
FIG. 1 is a fragmentary perspective view of a bed for holding an individual in an inclined or a supine position, provided with an anti-slide body support embodying the present invention in a particular form.

The invention will be described, with reference to FIGS. 1-4B, as embodied in a lightweight, compact, portable, self-enclosed, low maintenance, low cost, readily sanitizable, and manually or electronically operated body support device 10, including a back wall 12 which hooks centrally over, and rests flush against the interior side of, a bed footboard 14 of a hospital bed 16 or the like. A scissor jack 18 extends horizontally from the back wall and is connected at its forward end to a front wall 20 disposed parallel to back wall 12. The device further includes a manually or electronically operated screw 22 running between, and parallel to, back wall 12 and front wall 20, through a threaded or unthreaded bore of a trunnion 24 at one elbow or joint 26 of scissor jack 18 and through a threaded or unthreaded bore of a trunnion 28 at the other elbow or joint 30 of the scissor jack. This screw 22 upon clockwise rotation causes scissor jack 18 continuously to extend (for example) for a distance up to a maximum of approximately one foot, thereby separating front wall 20 of the device from back wall 12 and moving front wall 20 of the device such distance away from footboard 14 toward the top end of the bed, and upon counterclockwise rotation causes the scissor jack continuously to contract, moving front wall 20 toward back wall 12 and footboard 14 until front wall 20 of the device comes into contact with back wall 12 of the device, concealing the contracted scissor jack entirely within the front wall and back wall structures (it may be noted that the scissor jack, on a 3-foot-wide bed, could be dimensioned to provide a spacing between the back and front walls, upon full extension of the scissor, jack, of as much as up to about three feet).

Figure 2:
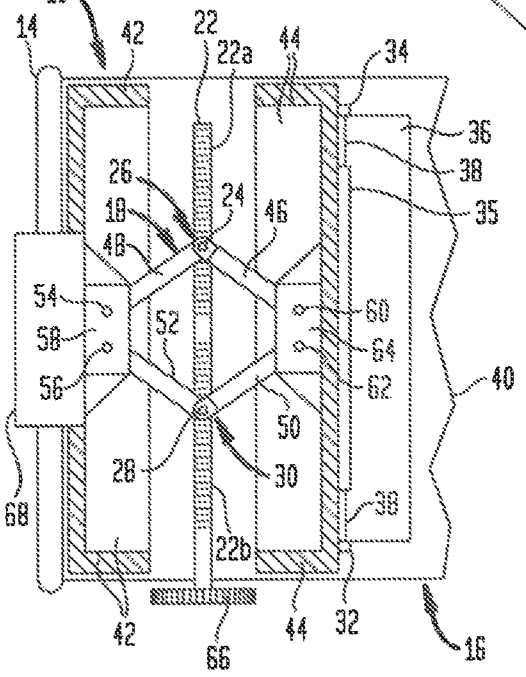
FIG. 2 is a schematic top plan view, partly in section, of the body support of FIG. 1.
Figure 3:
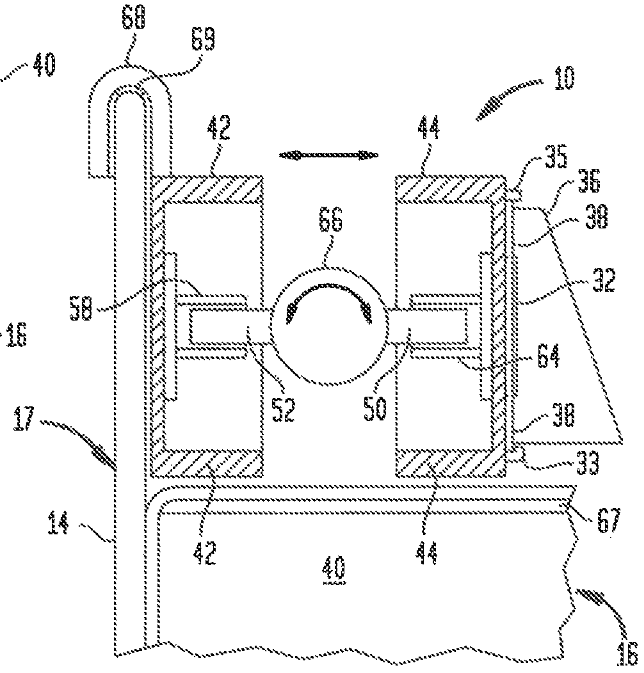
FIG. 3 is a schematic side elevational view, partly in section, of the body support of FIG. 1, at a larger scale than FIG. 2.
Figure 8A:
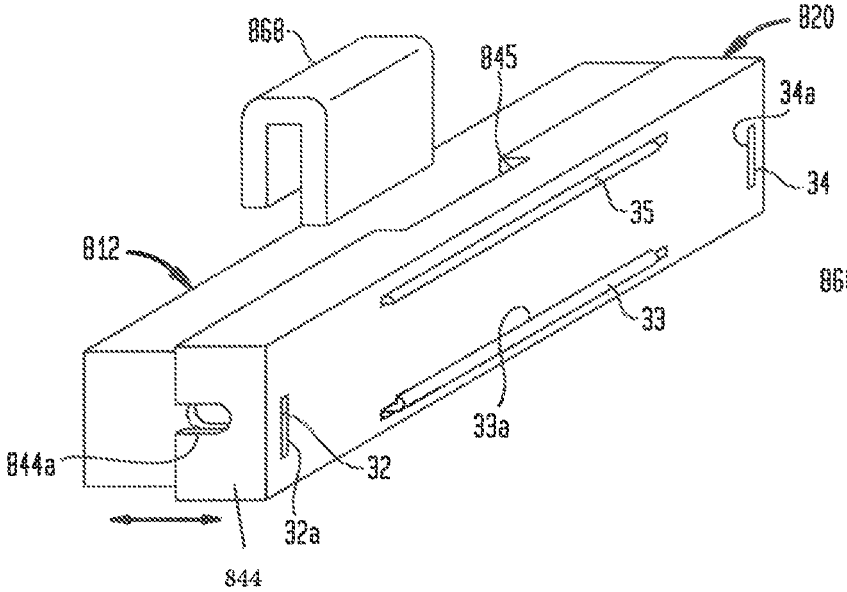
FIGS. 8A-8B are, respectively, a simplified perspective view of yet another modified embodiment of the body support of the invention and a view similar to FIG. 4B of the embodiment of FIG. 8A.
Figure 8B:
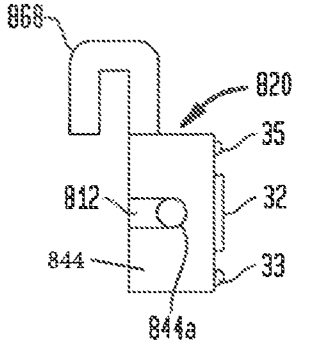
Figure 9:
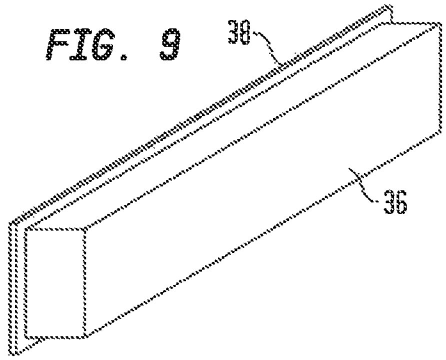
FIG. 9 is a perspective view of a pad removably mountable on the front wall of the body support of FIG. 8A.
Figure 10:
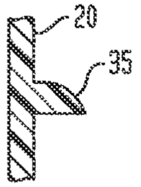
FIGS. 10-11 are enlarged simplified sectional views showing, respectively, upper and lower projections on the front wall of the body support of FIGS. 1-3, 8A-8B, 12, 15, and 20 for mounting the pad of FIG. 9.
Figure 11:
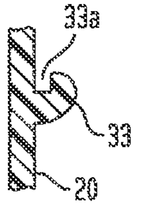
Figure 12:
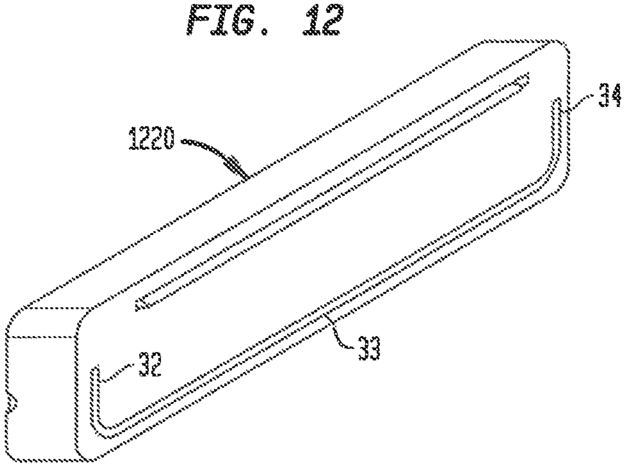
FIG. 12 is a perspective view of the front wall of an embodiment of the body support of the invention having rounded corners and showing a modified embodiment of the body support of the invention in which the lower and side projections on the front wall of the body support form one continuous projection.

As shown in FIGS. 1-3, 8A-12, 15, and 20, the device further includes a foam pad 36 attached to a flexible base 38 and removably secured by four raised structures 32, 33, 34, and 35 on the outer (forward) face of front wall 20. Base 38 slides on three sides into notches/grooves 32*a*, 33*a* and 34*a* (notch 33*a* being shown in detail in FIG. 11; notches 32*a* and 34*a* are similar but are oriented vertically rather than horizontally) respectively formed in the bottom and side raised structures 32, 33 and 34, the fourth raised structure 35 (at the top) cooperating with bottom and side raised structures 32, 33 and 34 to retain the pad in place. The pad may be sloped, for example, as shown in FIGS. 1-3 to allow some plantar flexion or may be rectangular in cross-section as shown in FIG. 9.

More particularly, in the embodiment of FIGS. 1-4B, body support 10 of the invention is designed for use with a bed 16 having a top (head) end (not shown), a bottom (foot) end 17 and a mattress 40 extending between them. This body support 10 comprises: a stationary, rigid back vertical wall 12 disposed at the bottom end of the bed in a fixed position in which the wall extends across the bed and above the mattress 40; a movable, rigid front vertical wall 20 extending parallel to back wall 12 across the bed and above the mattress, between the top and bottom ends of the bed; and a scissor jack 18 disposed between, secured to and connecting the front wall and the back wall, such that the scissor jack is capable of expanding and contracting horizontally to move the front wall away from and toward the back wall above the mattress in maintained parallel relation to the back wall.

Each of the front and back walls may conveniently or preferably be, for example, a molded thermosetting plastic member about one-half inch thick, having opposed plane vertically oriented major faces, with a length (corresponding to the width of the bed) of 36 inches and a height of five inches; raised pad-mounting structures 32, 33, 34, and 35 on the forward face of the front wall may be integrally molded therewith. In this embodiment, both back wall 12 and front wall 20 have side members (respectively designated 42 and 44, and also, conveniently, integrally molded with the walls) that extend around the edges of the walls to form therewith open box-like enclosures facing each other. That is to say, side members 42 of back wall 12 extend forwardly (toward the top end of the bed) from the forwardly facing surface of the back wall, and side members 44 of front wall 20 extend rearwardly from the rearwardly facing surface of the front wall, so that when the back wall and front wall are brought as close together as possible (see FIG. 4B), the free edges of their respective side members abut each other to provide a complete protective enclosure for scissor jack 18, which is mounted on and disposed between the facing surfaces of the back and front walls and (in such position of the front wall in FIG. 4B) is fully contracted.

The scissor jack has two pairs of arms respectively designated 46, 48 and 50, 52; each arm is, conveniently, an open-ended rigid metal channel member. At their central elbows or joints (respectively 26 and 30), the arms of each pair are pivotally connected to each other, for relative rotation about vertical axes, by the trunnions (arms 46 and 48 being connected by trunnion 24, arms 50 and 52 being connected by trunnion 28). The lower ends of lower arms 48 and 52 of the two pairs are mounted pivotally (also for rotation about vertical axes) as by rivets 54 and 56 in a base bracket 58 fixedly fastened by screws or otherwise to back wall 12 in the center of the forwardly-facing surface of that wall. The upper ends of upper arms 46 and 50 of the two pairs are similarly mounted pivotally, again for rotation about vertical axes, as by rivets 60 and 62 in a cap bracket 64 fixedly fastened by screws or otherwise to front wall 20 in the center of the rearwardly-facing surface of that wall. At their extremities remote from joints 26 and 30, the sidewails of channel-member arms 46, 48 and 50, 52 may be formed with gear teeth (not shown); if present, the gear teeth at the lower ends of arms 48 and 52 are positioned to mesh with each other within base bracket 58, and the gear teeth at the upper ends of arms 46 and 50 similarly mesh with each other within cap bracket 64. The arrangement of the arms, trunnions, rivets, and brackets is such that scissor jack 18 expands and contracts in a horizontal plane, moving the front wall horizontally, lengthwise of the bed and above the mattress, away from and toward the back wall.

Screw 22 of the scissor jack extends horizontally, transversely of the bed and above the mattress, through aligned axially horizontal bores (see FIG. 14) in trunnions 24 and 28. For simplicity, in the embodiments of FIGS. 1-2, 4A, 5A, 6A, and 7A, the scissor jack will be shown and described as having a screw 22 in which two different portions 22*a* and 22*b* along its length respectively have right- and left-hand threads respectively threadedly engaging correspondingly threaded bores in trunnions 24 and 28 such that clockwise turning of the screw causes the pairs of arms to expand, moving the front wall away from the back wall, while counterclockwise turning of the screw causes the pairs of arms to contract, moving the front wall toward the back wall.

A screw jack of such type is shown and described in U.S. Pat. No. 1,709,746, the entire disclosure of which is incorporated herein by this reference. As illustrated in FIG. 2 of that U.S. Pat. No. 1,709,746, a right- and left-hand screw does not undergo any longitudinal (axial) movement relative to the base of the jack during expansion and contraction of the jack between fully contracted and fully expanded positions. Consequently, a handle or knob connected to one end of the right- and left-hand screw 22 for manual or electronic operation of the jack, in particular embodiments of the present invention, does not move laterally inward or laterally outward relative to the bed as the jack is expanded or contracted. Other types of scissor jacks, however, e.g., scissor jacks having a screw with a single-handed thread that threadedly engages only the bore of one trunnion, the bore of the other trunnion being unthreaded, are also embraced within the invention, as will hereafter be further explained.

The channels of upper arms 46 and 50 open toward the channels of lower arms 48 and 52, being respectively disposed rearwardly and forwardly of screw 22; hence, in the contracted position of the scissor jack, the screw is enclosed within arms 46, 48 and 50, 52.

Screw 22 has a knob 66 accessible at a side of the bed (beyond the ends of the front and back walls, outside the enclosure formed by side members 42 and 44) for turning the screw in either direction. Preferably, the diameter of knob 66 does not exceed the horizontal thickness of body support 10 when the front and back walls are closed together. When the screw is not being manually or electronically turned, the scissor jack maintains the front wall stationary relative to the back wall in the position to which it has been moved.

At the end of support unit 10 where knob 66 is located, side members 42 and 44 of the back and front walls have centered semicircular edge notches 42*a* and 44*a* (FIG. 4B) cooperatively defining a hole (when the front wall is fully contracted against the back wall) through which screw 22 projects. As the knob is turned clockwise and the scissor jack expands, progressively and continuously moving the front wall forwardly away from the back wall, side members 42 and 44 separate progressively, and the screw and knob also move forwardly (toward the top end of the bed) away from the back wall at half the rate of movement of the front wall.

Scissor jack 18 may be, in itself, essentially conventional in design, mechanism and operation, as represented by scissor jacks heretofore commonly employed to elevate (jack up) automobiles and other vehicles or objects. For fully detailed descriptions of such conventional scissor jack construction and operation, see U.S. Pat. No. 1,709,746, cited above, and also U.S. Pat. Nos. 4,055,329, 4,802,653 and 6,375,161, the entire disclosures of which are incorporated herein by this reference. In the described use of these conventional scissor jacks, they are disposed, however, with the jack base placed on the ground or floor beneath the vehicle or object to be elevated and the cap positioned to engage a load-bearing substructure of the vehicle or object, so that the jack expands in a vertical direction to raise the vehicle or object in an upward direction. In the present invention, in contrast, a scissor jack mechanism is arranged to expand horizontally, for moving a body support front wall horizontally lengthwise of a bed to provide adjustable support for a recumbent individual's feet and thereby to prevent downward slipping of the individual in the bed. In the present invention, as in the automobile jack, the expansion of the scissor jack provides the desired motion of the object upon which it acts, and the jack mechanism also maintains the object fixed in the selected position once that position has been reached (in the present invention, the object moved by the scissor jack is front wall 20, not the bed occupant, whereas, for example, the conventional jack raises a vehicle or other often heavy object).

Very advantageously, the described embodiment of the present invention is a portable device, not built into a bed, but available to be moved from bed to bed as needed. To this end, back wall 12 is removably mountable at the bottom end of the bed in the aforesaid fixed position, wherein the front and back walls are both above mattress 40 and above bedclothes 67 (sheets, blankets) that may be on mattress 40. The bed 16, as shown (FIGS. 1-3), has a fixed transverse footboard 14 vertically projecting (e.g., for a distance of about eight inches) above mattress 40; back wall 12 of body support 10 is provided with a hook member 68, either formed integrally therewith or permanently attached thereto at a central location along back wall 12, for hooking over footboard 14 to mount back wall 12 thereto with back wall 12 disposed on (and flush with) the side of footboard 14 facing the top end of the bed. Hook 68 is a sturdy, rigid element, typically one inch in thickness, extending along the upper edge of footboard 14 for a sufficient distance (e.g., six inches) to provide stable, stationary support. A thin layer 69 of rubber anti-shift padding may be provided on the underside of hook 68 for engagement with the top surface of footboard 14 to prevent lateral sliding of hook 68 and body support 10 relative to thotboard 14 (FIGS. 1, 3, 4B, 5B, 6B, and 7B). Conveniently, hook 68 and back and front walls 12 and 20 may be configured to provide a clearance of, for example, about two inches between body support 10 mounted on footboard 14 and hare mattress 40 to facilitate change of bedclothes 67 without removal of the body support unit from the bed.

The back wall, the front wall and the scissor jack are secured together as a portable unit, mountable on and removable from a bed, the scissor jack stably connecting the front wall to the back wall to facilitate transporting and installing or removing body support 10. A handle 70 may be mounted on (or formed integrally with) hook 68 for ease of carrying (and possibly storing) the body support unit (FIGS. 4B, 5B, 6B, and 7B).

Use of body support 10 may now be readily explained. With body support 10 mounted by hook 68 on footboard 14, and back and front walls 12 and 20 initially fully closed and scissor jack 18 fully contracted as shown in, for example, FIGS. 4A-4B, a nurse or other attendant manually or electronically turns knob 66 clockwise to move front wall 20 horizontally forward toward the top end of the bed until it reaches a desired location to serve as a padded foot support for a specific individual. This forward movement is continuous, not incremental, enabling very precise positioning of the front wall relative to the back wall. The individual may already be in the bed, so that the proper location is determined by the position of his/her feet, or the individual's height may be known and the front wall location may be set to accommodate that height; for the latter situation, it may be helpful to provide permanent calibration marks on knob 66 or on a visible portion of arm 46, 48, 50, or 52 of the scissor jack to indicate the appropriate settings for different individual heights.

In either event, once front wall 20 has been correctly located, the scissor jack mechanism will maintain front wall 20 in the selected location. Front wall 20 now serves, in effect, as a padded footboard for the bed occupant, and since front wall 20 has been located at a selected optimum position for the particular individual's height, front wall 20 will prevent undesired downward sliding of the individual in the bed (often to a hard footboard), with consequent increased comfort and decreased risk of patient and non-patient, or other bed occupant and non-bed occupant, injuries or of other medical complications.

Figure 4A:
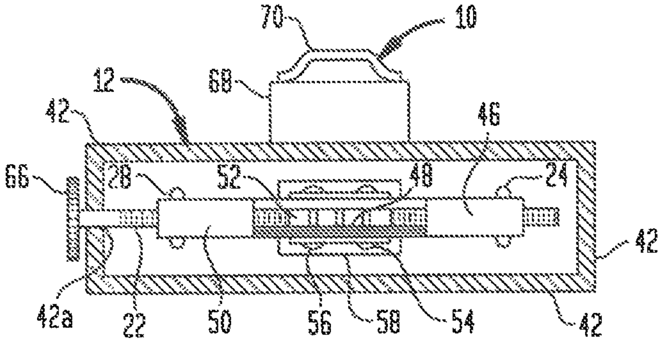
FIG. 4A is a schematic front elevational view of the back wall of the body support of FIG. 1, with the jack fully contracted and the forward portion of the scissor jack and the screw partly broken away.
Figure 4B:
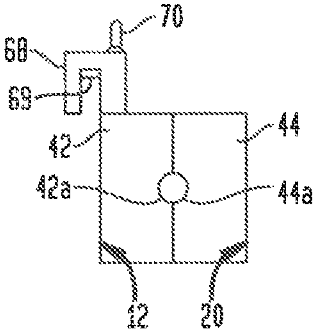
FIG. 4B is a simplified side elevational view of the body support of FIGS. 1 and 4A, with the front wall fully contracted against the back wall (i.e., with the front wall in a position of closest approach to the back wall), omitting the screw knob.

To move body support 10 when no longer required, knob 66 is turned counterclockwise to contract front wall 20 until it abuts back wall 12, at which point the scissor, jack is fully contracted and enclosed within the protective housing constituted by back and front walls 12 and 20 and their respective side members 42 and 44 (compare the partly open position of FIGS. 2-3 with the fully closed position of FIGS. 4A-4B). The body support unit then can be readily unhooked from the bed for transport and use elsewhere (with pad 36 being replaced, for hygienic reasons, before the device is employed with a different bed occupant).

Several examples of variations in back and front wall design are illustrated in FIGS. 4A-8B. In the embodiment described above (shown, for example, in FIGS. 4A-4B), the back wall and front wall are identical to each other in height and length (measured transversely of the bed). The dimensions of front wall 20 remain essentially the same in all the variations now to be described, as these dimensions are dictated by the requirements for a satisfactory element to engage and support the patient's, or other bed occupant's, feet in contact with the front wall. The embodiment of FIGS. 4A-4B and 8A-8B, wherein the dimensions of the back wall are the same as, or just slightly smaller than, those of the front wall, afford the most complete enclosure of the contracted scissor jack 18, provide the greatest protection of the scissor jack against damage or contamination by dust, dirt or infectious germs when the unit is not in use and, because they provide the greatest contact area between the back wall and the permanent bed footboard 14, achieve the greatest stability of the body support unit during use.

Figure 5A:
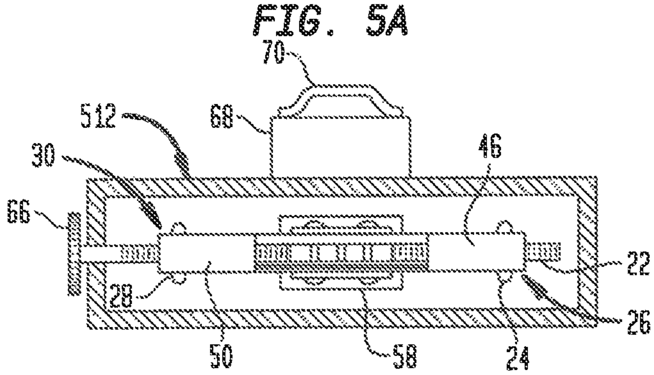
FIGS. 5A-5B are, respectively, a view similar to FIG. 4A of the back wall of a modified embodiment of the body support of the invention and a view similar to FIG. 4B of the modified embodiment including the back wall shown in FIG. 5A.
Figure 5B:
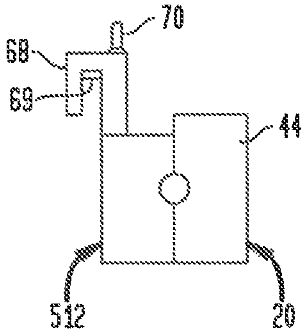
Figure 6A:
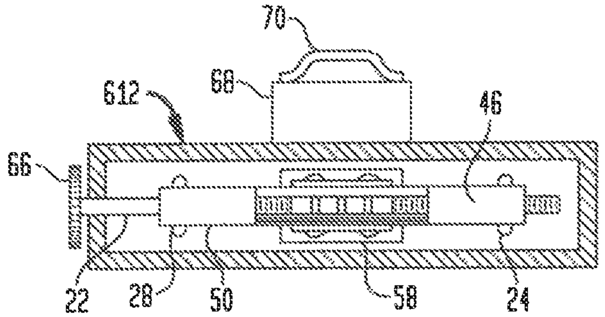
FIGS. 6A-6B are, respectively, a view similar to FIG. 4A of the back wall of a further modified embodiment of the body support of the invention and a view similar to FIG. 4B of the further modified embodiment including the back wall shown in FIG. 6A.
Figure 6B:
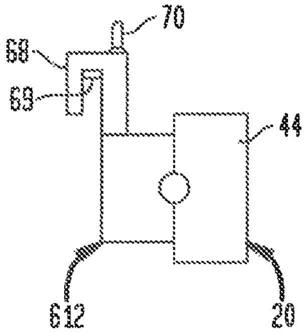
Figure 7A:
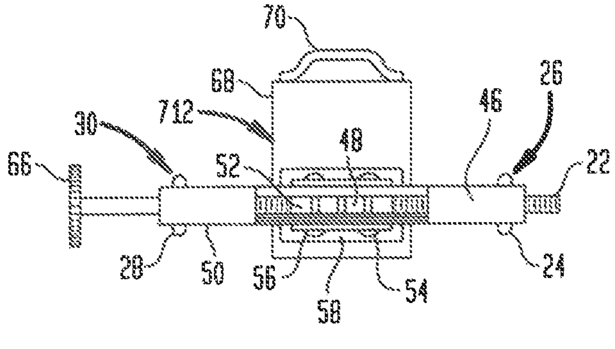
FIGS. 7A-7B are, respectively, a view similar to FIG. 4A of the back wall of a still further modified embodiment of the body support of the invention and a view similar to FIG. 4B of the still further modified embodiment including the back wall shown in FIG. 7A.
Figure 7B:
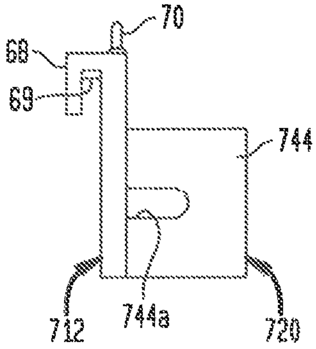

In FIGS. 5A-5B, the vertical height of back wall 512 is reduced so that the top of the back wall is just high enough to provide full side member enclosure of the contracted scissor jack, freeing portions of footboard 14 for other devices as may sometimes be necessary; the latter advantage is afforded, as well, by the devices of FIGS. 6A-6B and 7A-7B. In FIGS. 6A-6B, the vertical height of back wall 612 is also reduced at the bottom, being just large enough to house the contracted scissor jack. In FIGS. 7A-7B, back wall 712 is only as wide as hook 68; among the variations here described, this embodiment provides the least back wall protection for the contracted scissor jack and also the least area of stabilizing contact between the back wall and footboard 14. In the embodiment of FIGS. 7A-7B, front wall side members 744 are increased in front-to-rear dimension so as to protect the otherwise exposed contracted scissor jack, and edge notch 744*a* of the side member 744 of front wall 720 is elongated to accommodate the travel of screw 22. Finally, in FIGS. 8A-8B, the length and height of back wall 812 are both made smaller than the length and height of front wall 820 so that the back wall (including horizontally extending side members thereof) and the scissor jack are completely enclosed (surrounded) by the front wall horizontally extending side members in directions perpendicular to the movement directions of the scissor jack when the jack is fully contracted (FIG. 8B) and also so that the scissor jack is completely enclosed by the horizontally extending side members of the front and back walls 812. 820 cooperatively in directions perpendicular to the movement directions of the scissor jack at positions where the front wall 820 is spaced farther away from the back wall 812 (FIG. 8A) than at the position where the jack is fully contracted (FIG. 8B) because the horizontally extending side members of the front wall 820 surround the horizontally extending side members of the back wall 812 as can be seen in FIGS. 8A and 8B; again, edge notch 844*a* of front wall side member (horizontally extending side member) 844 is elongated to accommodate screw travel, while the top side member of front wall 820 is cut away at 845 to accommodate hook 868 which is fastened to back wall 812. Any of the embodiments of FIGS. 5A-5B, 6A-6B and 7A-7B may have the walls dimensioned so that the back wall (including any horizontally extending side members thereof) is completely enclosed (surrounded) by the front wall (horizontally extending side members) in directions perpendicular to the movement directions of the scissor jack. In a further modification, shown in FIG. 12, front wall 1220 of the body support, and also the back wall (not shown), are formed with rounded corners, thereby to avoid sharp corners that might cause injury to patients and non-patients, or other bed occupants and non-bed occupants, or that might become chipped during storage or repeated transport.

Figure 13:
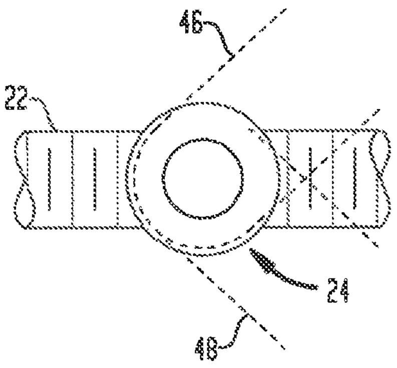
FIG. 13 is an enlarged plan view of an illustrative example of a trunnion suitable for use in the scissor jack in the body support of FIGS. 1-8B, 15 and 20.
Figure 14:
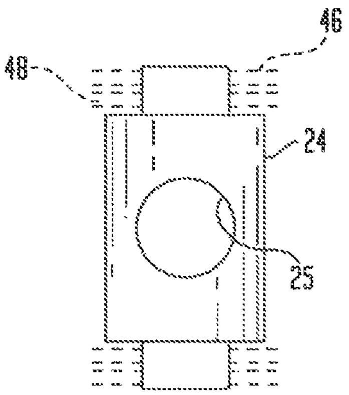
FIG. 14 is an elevational view of the trunnion of FIG. 13.

Trunnion 24 of the scissor jack shown in FIG. 2 is illustrated in detail in FIGS. 13-14, Screw 22 extends through, and threadedly engages in particular embodiments of the present invention, bore 25 of the trunnion; the lower ends of the sidewalls of upper arm 46, and the upper ends of the sidewalls of lower arm 48, are pivotally mounted on the ends of the trunnion (trunnion 28 and arms 50 and 52 are similarly designed and oriented).

Figure 15:
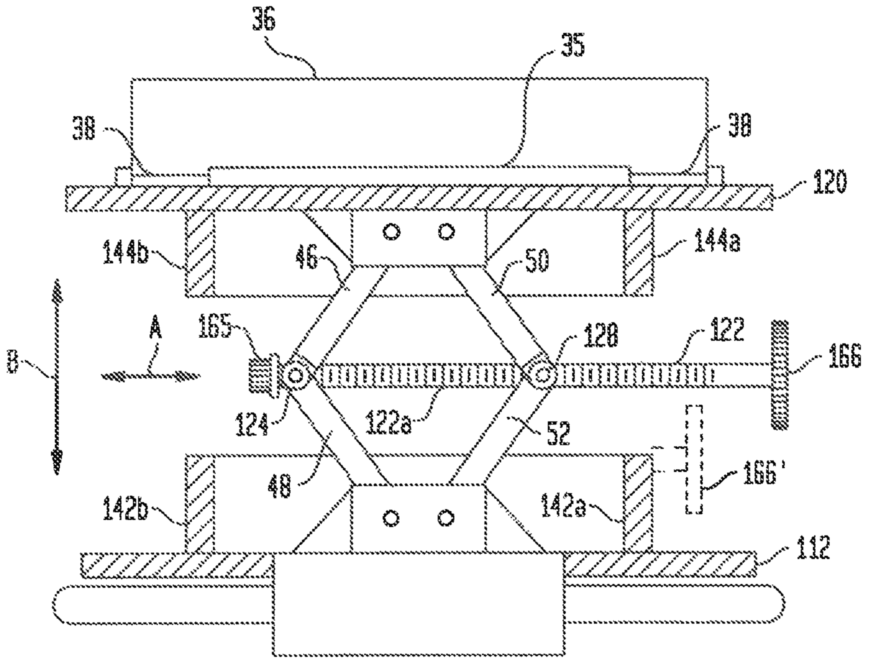
FIG. 15 is a schematic plan view, similar to FIG. 2, of another embodiment of the body support of the invention.
Figure 16:
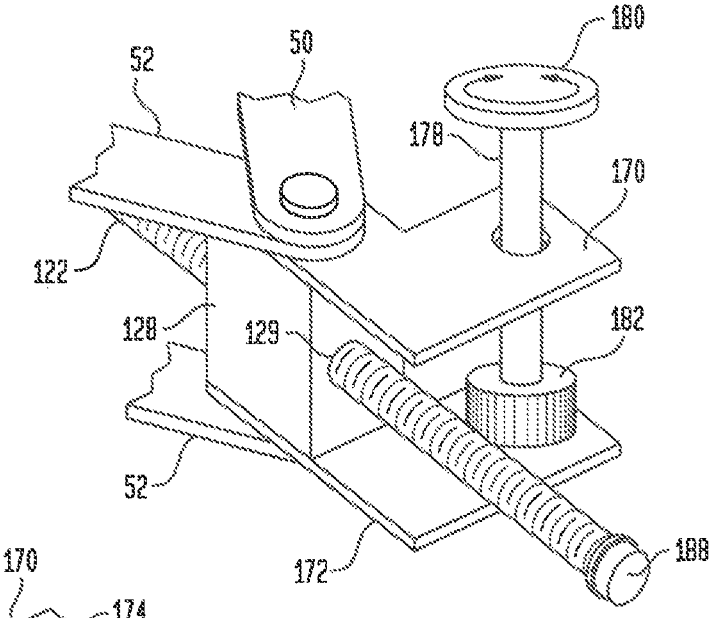
FIG. 16 is a schematic fragmentary perspective view of an alternative arrangement for turning the screw in the device of FIG. 15.
Figure 17:
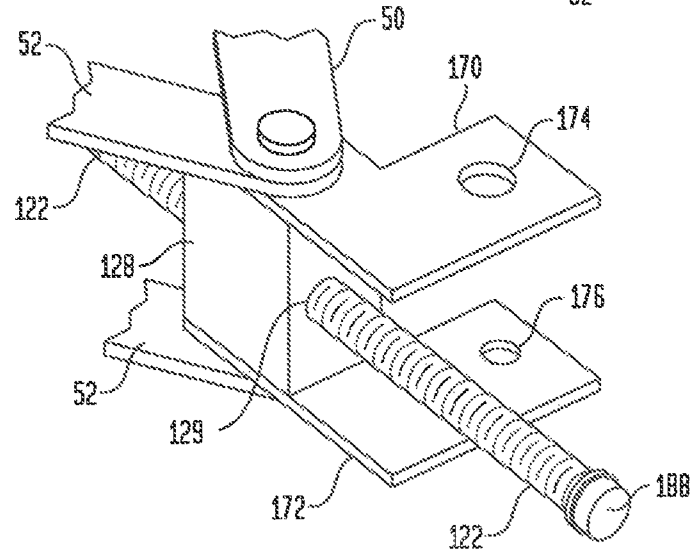
FIG. 17 is a view similar to FIG. 16 illustrating particular structural features of the arrangement therein shown.
Figure 18:
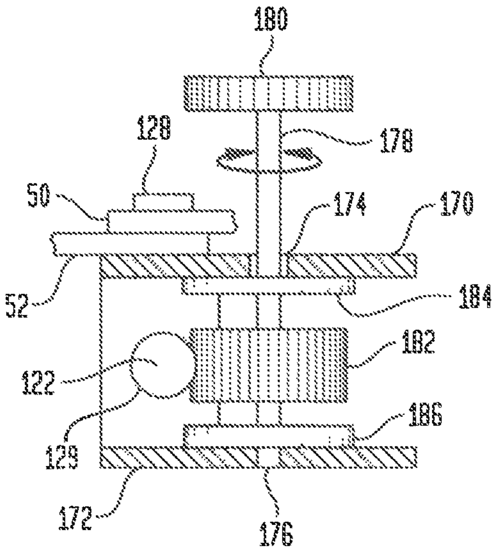
FIG. 18 is an elevational view, partly in section, of the arrangement of FIG. 16.

FIG. 15 illustrates another embodiment of body support 10 of the invention, including a scissor jack of a type different from that of FIGS. 1-4B. In the scissor jack of FIG. 15, screw 122 has a single threaded portion 122*a*, which extends through and threadedly engages a threaded bore in trunnion 128. The portion of screw 122 extending rotatably through the bore (not shown) of the other trunnion, here designated 124, is not threaded, and the bore of trunnion 124 is likewise unthreaded. Further, screw 122 is provided with structure 165, such as (for example) a bearing, washers and a locking pin arranged on opposite sides of trunnion 124, to prevent longitudinal (i.e., axial) movement of the screw relative to trunnion 124, although the screw is rotatable within the bore of trunnion 124. Such devices, employed with scissor jacks in which the screw is held against axial movement relative to one of the trunnions, are shown (for example) in U.S. Pat. Nos. 4,055,329, 4,802,653 and 6,375,161, cited above, to which reference may be made for detailed descriptions of scissor jacks of this type.

The sense of thread 122*a* and the corresponding thread in the bore of trunnion 128 is such that rotation of screw 122 in one direction causes the scissor jack to expand, and rotation of the screw in the opposite direction causes the scissor jack to contract. Since, as described above, screw 122 is prevented from moving axially relative to trunnion 124 (connecting scissor jack arms 46 and 48), expansion of the scissor jack moves screw 122 laterally of the bed (to the right in FIG. 15), and contraction of the scissor jack moves screw 122 laterally of the bed in the opposite direction (to the left in FIG. 15), such motion being indicated in FIG. 15 by ARROW A. At the same time, expansion of the scissor jack moves front wall 120 lengthwise of the bed, away from hack wall 112, concurrently moving the screw in the same direction, while contraction of the scissor jack moves front wall 120 and screw 122 lengthwise of the bed toward the back wall. Thus, as front wall 120 moves straight up or down the bed (such motion being indicated by ARROW B in FIG. 15), screw 122 respectively moves up and to the right or down and to the left.

A manually or electronically operable member shown as a knob 166 is connected to screw 122 to be accessible to a human operator at the side of the bed on the right in FIG. 15. The position of this knob when the scissor jack is fully contracted is indicated by broken line 166'; the solid line position of knob 166 in FIG. 15 is the position it reaches when the scissor jack has been expanded, and the front wall moved, to the extent shown in that FIGURE. It will be seen that at this point the knob has moved laterally outward, relative to the side of the bed, from the position 166', unlike knob 66 in the embodiments of FIGS. 1-3, 4A, 5A, 6A, and 7A described above. The maximum rightward travel of the knob, when the scissor jack is fully expanded, may be (for example) about six inches from the position 166' of the knob when the scissor jack is fully contracted. If the near side members (42 and 44 in FIG. 2) of the back and front walls (12 and 20 in FIG. 1) were at the same locations as in FIG. 2, they would interfere with access to knob 166 as the scissor jack contracts and could interfere with requisite motion of the knob itself. Accordingly, in FIG. 15 side members 142*a* and 144*a* of back and front walls 112 and 120 adjacent knob 166 are offset inwardly relative to the side of the bed, to a sufficient extent (e.g., nine inches off center on each side) to enable manual access to the knob and freedom of knob movement throughout the range of scissor jack expansion while still providing complete enclosure of the fully contracted scissor jack; opposite side members 142*b* and 144*b* may be similarly offset inwardly, affording excellent interwall support. To accommodate further the range of knob movement and ease of access to the knob, front wall 120 and back wall 112 may each be made slightly shorter than the three-foot width of the bed (e.g., reduced in length to 30 inches, which is still fully adequate for the function of the front wall as a foot support and for stabilizing contact of the back wall with the footboard).

The element for operating the scissor jack of the body support of FIG. 15 has been shown, by way of example, as a manually operated knob connected to a free end of screw 122 extending to the right (in FIG. 15) of trunnion 128. Alternative types of handles or other mechanisms for turning screw 122 (or screw 22 of FIGS. 1-2, 4A, 5A, 6A, and 7A, screw 122 of FIGS. 16-19 or screw 222 of FIG. 20) may be employed. For instance, the knob may incorporate an imbedded crank handle (not shown) which, when rotated to a position perpendicular to the knob face, can be used to turn the knob and thus rotate the screw. Further, the right-hand end of the screw may terminate in structure arranged to receive a handle (not shown) for rotating the screw.

As a further alternative to knob 66 of FIGS. 1-3, 4A, 5A, 6A, and 7A or knob 166 of FIG. 15, horizontal screw 22 of FIGS. 1-2, 4A, 5A, 6A, and 7A or horizontal screw 122 of FIG. 15 may be driven by an axially vertical screw with a manually or electronically operated knob projecting through the top of the device, with notches in the front wall and back wall top side members corresponding to notches 42*a* and 44*a* in FIG. 4B to accommodate, as necessary, the location and motion of the vertical screw. The point of contact between the vertical and horizontal screws can be positioned, for example, at the location of trunnion 28 of FIGS. 2, 4A, 5A, 6A, and 7A or trunnion 128 of FIG. 15.

An example of such an arrangement, for use with the body support of FIG. 15, is illustrated in FIGS. 16-19 (the illustration would be similar for the body support of FIGS. 1-8B). In this case, trunnion 128 is shown as having a semi-rectangular solid body, rather than a cylindrical body as in FIGS. 13-14. A pair of L-shaped plates 170 and 172 are, for example, respectively welded to the top and bottom of trunnion 128, extending horizontally therefrom in parallel relation to each other, and respectively above and below scissor jack screw 122, which extends through and threadedly engages the threaded bore 129 of trunnion 128. Holes 174 and 176 are respectively provided in plates 170 and 172, these holes being vertically aligned with each other, and lower hole 176 being smaller than upper hole 174. An axially vertical control shaft 178 extends downwardly through upper hole 174 with the lower end of the shaft inserted in smaller lower hole 176. Shaft 178 also extends above plate 170 and above the top side members (not shown) of front wall 120 and back wall 112; a knob 180, mounted at the top of this shaft, is thus accessible for manual or electronic operation to rotate shaft 178 on its vertical axis relative to plates 170 and 172.

At a location between the two plates, a gear 182 is mounted on shaft 178 for rotation therewith when the knob is turned. Gear 182 is dimensioned, positioned and configured so that its teeth engage the teeth of screw 122 and cause the screw to rotate on its horizontal axis when the gear is rotated on its vertical axis (i.e., the axis of shaft 178) by turning of knob 180. Thus, gear 182 and shaft 178 together constitute the aforementioned vertical screw whereby axially vertical rotation of knob 180 drives horizontal rotation of screw 122, expanding or contracting the scissor jack.

Larger and smaller holes 174 and 176 allow the shaft to rotate and maintain horizontal positioning of gear teeth 182 of shaft 178 vis-à-vis screw 122. Vertical shaft 178 may have, for example, circular extensions 184 and 186 (FIG. 18) respectively positioned just inside (and parallel to) top and bottom plates 170 and 172, to maintain vertical positioning of the teeth of gear 182 vis-à-vis screw 122, although other vertically positioning mechanisms (such as locking pins) also may be utilized.

Figure 19:
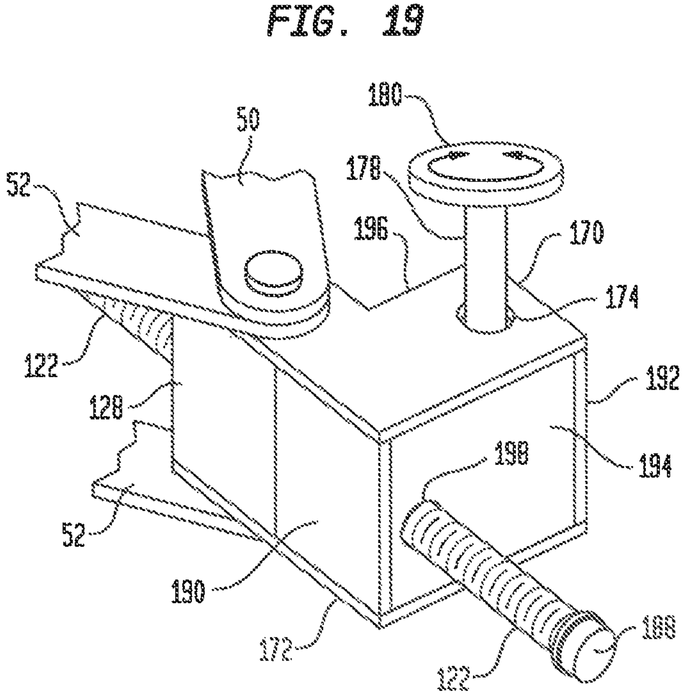
FIG. 19 is a view similar to FIG. 16 illustrating a modification thereof.

Since, in the structure of FIGS. 16-19, the end of screw 122 adjacent the side of the bed is exposed, it may be covered by a safety cap 188. If desired, plates 170 and 172 may be connected by side walls 190 and 192 and even by end walls 194 and 196 (having a hole 198 for screw 122), as schematically illustrated in FIG. 19, to add further stability to the structure and also provide protection for gear 182.

Figure 20:
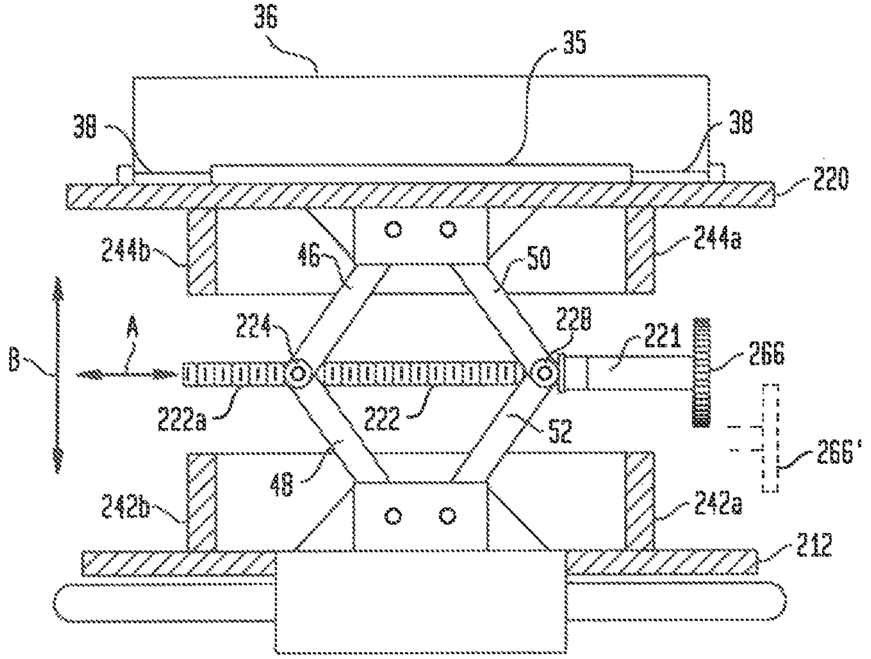
FIG. 20 is a view similar to FIG. 15 of yet another embodiment of the invention.

In yet another arrangement, shown in FIG. 20, screw 222 has a single threaded portion 222*a*, which extends through and threadedly engages a threaded bore in trunnion 224. The portion of screw 222 extending rotatably through the bore (not shown) of the other trunnion, here designated 228, is not threaded, and the bore of trunnion 228 is likewise unthreaded. Further, in this case, a rotatable sleeve or neck 221 surrounding screw 222 may extend between, and be attached to, the interior side of knob 266 (also attached to the screw) and the nearest non-threaded trunnion (in this case 228) to prevent the distance between non-threaded trunnion 228 and knob 266 from changing, thus forcing arms 46, 48 and 50, 52 of the scissor jack to expand or contract as screw 222 threadedly engages the threaded bore of trunnion 224.

The sense of thread 222*a* and the corresponding thread in the bore of trunnion 224 is such that rotation of screw 222 in one direction causes the scissor jack to expand, and rotation of the screw in the opposite direction causes the scissor jack to contract. Since, as described above, screw 222 is prevented from moving axially relative to trunnion 228 (connecting scissor jack arms 50 and 52), expansion of the scissor jack moves screw 222 laterally of the bed (to the left in FIG. 20), and contraction of the scissor jack moves screw 222 laterally of the bed in the opposite direction (to the right in FIG. 20), such motion being indicated in FIG. 20 by ARROW A. At the same time, expansion of the scissor jack moves front wall 220 lengthwise of the bed, away from back wall 212, concurrently moving the screw in the same direction, while contraction of the scissor jack moves front wall 220 and screw 222 lengthwise of the bed toward back wall 212. Thus, as front wall 220 moves straight up or down the bed (such motion being indicated by ARROW B in FIG. 20), screw 222 respectively moves up and to the left or down and to the right.

A manually or electronically operable member shown as a knob 266 is connected to screw 222 so as to be accessible to a human operator at the side of the bed on the right in FIG. 20. The position of this knob when the scissor jack is fully contracted is indicated by broken line 266'; the solid line position of knob 266 in FIG. 20 is the position it reaches when the scissor jack has been expanded, and the front wall moved, to the extent shown in that FIGURE. It will be seen that at this point the knob has moved laterally inward, relative to the side of the bed, from the position 266', unlike knob 66 in the embodiments of FIGS. 1-3, 4A, 5A, 6A, and 7A described above. The maximum inward travel of the knob, when the scissor jack is fully expanded, may be (for example) about six inches from the position 266' of the knob when the scissor jack is fully contracted. If the near side members (42 and 44 in FIG. 2) of the back and front walls (12 and 20 in FIG. 1) were at the same locations as in FIG. 2, they could interfere with requisite motion of knob 266 as the scissor jack expands. Accordingly, side members 242*a* and 244*a* of back and front walls 212 and 220 adjacent knob 266 are offset inwardly relative to the side of the bed, to a sufficient extent (e.g., nine inches off center on each side) to enable freedom of knob movement throughout the range of scissor jack expansion while still providing complete enclosure of the fully contracted scissor jack; opposite side members 242*b* and 244*b* may be similarly offset inwardly, affording excellent inter-wall support. To accommodate further the range of knob movement and ease of access to the knob, front wall 220 and back wall 212 may each be made slightly shorter than the three-foot width of the bed (e.g., reduced in length to 30 inches, which is still fully adequate for the function of the front wall as a foot support and for stabilizing contact of the back wall with the footboard).

Figure 21:
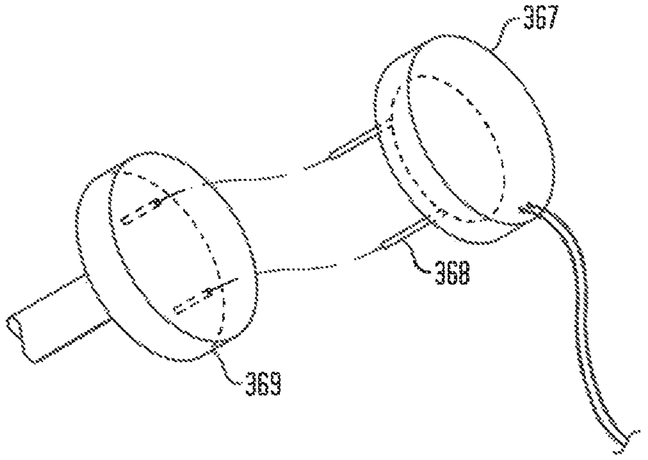
FIG. 21 is a schematic fragmentary perspective view of an example of an electronically operable knob utilizing a removable motor component.

As a further example of a mechanism for rotating screw 22 of FIGS. 1-2, 4A, 5A, 6A, and 7A, screw 122 of FIG. 15 or screw 222 of FIG. 20, an electronically operated knob or handle may be employed. Such an electronically operated knob, for example, could utilize a small motor that would rotate the knob either clockwise or counterclockwise at an appropriate number of revolutions per minute. That portion of the electronically operated knob containing the motor could be either permanently attached to the knob at the end of the screw or removable to allow the option of manually rotating the screw if desired or necessary (e.g., in instances where a source of electricity is not readily accessible or in the event of a power failure or outage). An example of an electronically operable knob, utilizing a removable motor component 367, with engagement prongs 368 designed to be inserted into corresponding holes in the manually operable knob 369, is illustrated in FIG. 21.

Figure 22:
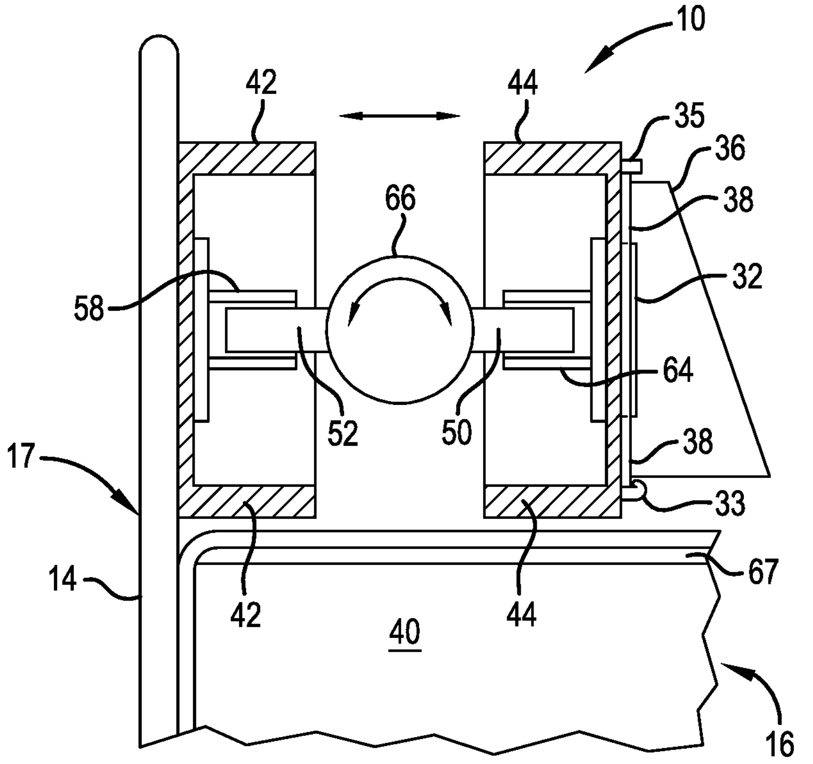
FIG. 22 shows a modification of the embodiment of FIGS. 1-4A in which the body support is built into a detachable or non-detachable bed footboard.

In addition, the invention embraces not only a separate, portable body support unit but also a body support built into a detachable or non-detachable bed footboard, as shown in FIG. 22.

It is to be understood that the invention is not limited to the features and embodiments hereinabove specifically set forth but may be carried out in other ways without departure from its spirit.

What is claimed is:

1. A body support configured to be permanently or removably attached to a bed having a head end, a foot end and a mattress extending between them, comprising:

a first wall configured to be held stationary at the foot end of the bed;

a second wall configured to support the feet of a person sitting on the bed; and a scissor jack connecting the first wall and the second wall, the scissor jack including:

a first pair of arms pivotally connected at a first joint;

a second pair of arms pivotally connected at a second joint; and a screw extending through the first and second joints and configured such that rotation of the screw in a first rotational direction causes the second wall to move in a first direction towards the head end of the bed, rotation of the screw in a second rotational direction causes the second wall to move in a second direction towards the foot end of the bed and, when not rotating, the screw prevents movement of the second wall relative to the first wall;

wherein side members of one of the first or second wall at least partially surround side members of the other of the first or the second wall in directions perpendicular to the first and second directions both at a fully contracted position of the scissor jack and at positions where the scissor jack has been expanded such that the second wall is spaced farther apart from the first wall than at the fully contracted position.

2. The body support as defined in claim 1, wherein:

the screw extends horizontally and transversely across the bed above the mattress; and the screw threadably engages at least one of the first and second joints.

3. The body support as defined in claim 2, wherein the screw threadably engages both of the first and second joints.

4. The body support as defined in claim 1, further including a manually or electronically rotatable member operably coupled to the screw.

5. The body support as defined in claim 4, wherein the manually or electronically rotatable member is a manually rotatable knob.

6. The body support as defined in claim 4, wherein the manually or electronically rotatable member comprises an electric motor.

7. The body support as defined in claim 1, wherein the body support is configured to be removably mountable at the foot end of the bed.

8. The body support as defined in claim 7, further including a hook configured to hook over a footboard disposed at the foot end of the bed.

9. The body support as defined in claim 1, wherein the first wall, the second wall and the scissor jack are secured together as a portable unit that is removably attachable to the bed.

10. The body support as defined in claim 1, wherein the side members of the first and second walls are configured to laterally enclose a space within which the scissor jack is disposed.

11. A body support configured to be permanently or removably attached to a bed having a head end, a foot end and a mattress extending between them, comprising:

a first wall configured to be held stationary at the foot end of the bed;

a second wall configured to support the feet of a person sitting on the bed; and a scissor jack connecting the first wall and the second wall, the scissor jack including:

a first pair of arms pivotally connected at a first joint;

a second pair of arms pivotally connected at a second joint; and a screw extending through the first and second joints and configured such that rotation of the screw in a first rotational direction causes the second wall to move in a first direction towards the head end of the bed, rotation of the screw in a second rotational direction causes the second wall to move in a second direction towards the foot end of the bed and, when not rotating, the screw prevents movement of the second wall relative to the first wall, wherein both the first wall and the second wall have side members configured to laterally enclose a space within which the scissor jack is disposed to cooperatively protect the scissor jack in directions perpendicular to the first and second directions when the second wall is in a position of closest approach to the first wall and at positions where the second wall is spaced farther apart from the first wall; and the side members of one of the first or second wall at least partially surround the side members of the other of the first or the second wall in directions perpendicular to the first and second directions both at a fully contracted position of the scissor jack and at positions where the scissor jack has been expanded such that the second wall is spaced farther apart from the first wall than at the fully contracted position.

12. The body support as defined in claim 1, further including a pad removably mounted on a surface of the second wall facing toward the head end of the bed.

13. The body support as defined in claim 12, wherein the pad has a vertically sloping surface facing the head end of the bed.

14. A body support configured to be permanently or removably attached to a bed having a head end, a foot end and a mattress extending between them, comprising:

a first wall configured to be held stationary at the foot end of the bed;

a second wall configured to support the feet of a person sitting on the bed;

a pad removably mounted on a surface of the second wall facing toward the head end of the bed; and a scissor jack connecting the first wall and the second wall, the scissor jack including:

a first pair of arms pivotally connected at a first joint;

a second pair of arms pivotally connected at a second joint; and a screw extending through the first and second joints and configured such that rotation of the screw in a first rotational direction causes the second wall to move in a first direction towards the head end of the bed, rotation of the screw in a second rotational direction causes the second wall to move in a second direction towards the foot end of the bed and, when not rotating, the screw prevents movement of the second wall relative to the first wall;

wherein:

the pad includes a flexible base extending laterally outward beyond the sides of the pad; and the surface of the second wall facing the head end of the bed bears projections, including notched retainers for receiving edge portions of the flexible base, to removably hold the pad on the second wall.

15. The body support as defined in claim 1, wherein:
each of the arms is an open-ended channel member; and
when the second wall is in a position of closest approach to the first wall, the screw is enclosed within the arms.

16. The body support as defined in claim 1, wherein the scissor jack is adjustable in continuous increments.

17. The body support as defined in claim 16, further including:
a manually or electronically rotatable member operably coupled to the screw.

18. The body support as defined in claim 17, wherein:
the screw extends horizontally and transversely across the bed above the mattress; and
the screw threadably engages at least one of the first and second joints.

19. The body support as defined in claim 18, wherein:
the manually or electronically rotatable member is a manually rotatable knob;
a pad is removably mounted on a surface of the second wall facing toward the head end of the bed;
the pad has a vertically sloping surface facing the head end of the bed;
each of the arms is an open-ended channel member; and
when the second wall is in a position of closest approach to the first wall, the screw is enclosed within the arms.

20. A bed comprising the body support according to claim 1 built into a detachable or non-detachable footboard of the bed.

21. The body support as defined in claim 14, wherein side members of one of the first or second wall at least partially surround side members of the other of the first or the second wall in directions perpendicular to the first and second directions both at a fully contracted position of the scissor jack and at positions where the scissor jack has been expanded such that the second wall is spaced farther apart from the first wall than at the fully contracted position.

22. The body support as defined in claim 11, wherein the side members of one of the first or second wall completely surround the side members of the other of the first or second wall in directions perpendicular to the first and second directions both at a fully contracted position of the scissor jack and at positions where the scissor jack has been expanded such that the second wall is spaced farther apart from the first wall than at the fully contracted position.

* * * * *